United States Patent [19]

Dudley

[11] Patent Number: 5,025,620

[45] Date of Patent: Jun. 25, 1991

[54] NUT HARVESTING APPARATUS

[76] Inventor: James M. Dudley, 11484 Pine St., Jacksonville, Fla. 32258

[21] Appl. No.: 558,234

[22] Filed: Jul. 26, 1990

[51] Int. Cl.⁵ .................................................. A01D 51/00
[52] U.S. Cl. ................................... 56/328.1; 414/440
[58] Field of Search .................... 56/328.1, 200, 202, 56/203, 204; 414/440, 438

[56] References Cited

U.S. PATENT DOCUMENTS

| | | | |
|---|---|---|---|
| 3,613,341 | 10/1971 | Reeves | 56/328.1 |
| 3,744,225 | 7/1973 | Reeves | 56/328.1 |
| 3,888,370 | 6/1975 | Gamblin | 56/328.1 X |
| 3,995,759 | 12/1976 | Hollrock et al. | 56/328.1 X |
| 4,066,179 | 1/1928 | Livingston | 56/328.1 X |
| 4,593,519 | 6/1986 | Kimball | 56/328.1 |

Primary Examiner—Stephen J. Novosad
Attorney, Agent, or Firm—Arthur G. Yeager

[57] ABSTRACT

A rolling apparatus to be pushed by hand to roll over ground where nuts have fallen, pick up the nuts, and collect them in a bag; the apparatus including a roller assembly of a plurality of thin wheel units each having a flexible wall member which contacts the ground and is spaced from the wall member of the next adjacent wheel unit so as to clamp nuts between adjacent walls and carry the clamped nuts around the roller assembly to a comb-like stripper which pries the nuts from the wall members and guides them into a collection bag or other collection devices.

20 Claims, 4 Drawing Sheets

NUT HARVESTING APPARATUS

BACKGROUND OF THE INVENTION

The task of harvesting nuts has always been a tiresome job since it requires picking up nuts from the ground under the nut trees. The back-breaking nature of the job has been the motivation for many past inventors to devise machines to do the job. In general these have been large cumbersome machines self-propelled or towed behind a tractor with belt conveyors to receive nuts swept from the ground and deliver the nuts to other portions of the machine for cleaning, sorting, classifying and bagging. Typical of such machines are those disclosed in U.S. Pat. Nos. 2,679,133; 3,148,493; 4,364,222; 3,387,442; 3,475,889; 3,530,655; 3,579,969; and 3,591,948. These machines are all large production harvesters that might be used for a farm having hundreds of acres of nut trees. No one appears to have considered how to provide a harvester for a small producer who cannot afford to buy a large machine.

It is an object of this invention to provide a manually operable nut harvester. It is another object of this invention to provide a nut harvester that can be rolled over the ground to pick up nuts on the ground, and to deposit them in a collection bag. It is another object to provide a harvester for pecans that can be pushed over the ground like a lawn mower to pick up and bag the pecans. Still other objects will become apparent from the more detailed description which follows.

BRIEF SUMMARY OF THE INVENTION

This invention relates to a nut harvesting apparatus comprising a frame having a front, a back, and two sides, a lateral axle extending from one to the other of said sides, a plurality of ground engaging nut collecting wheels individually rotatably mounted on side-by-side said axle, said frame including handle bar means at said back to be pushed by a person walking behind said frame, a bag support at said front adapted to support an open collection bag thereon for receiving harvested nuts therein; and a nut stripping means to remove nuts from said wheels and direct them into said open bag; each said nut collecting wheel being a thin structure approximately the thickness of the largest diametrical dimension of the nuts being collected and having a radially outwardly projecting wall member having a radial height outwardly of said rim at least as large as the said largest diametrical dimension of said nut and being adapted in combination with the wall member of the next adjacent wheel to clamp said nut therebetween; said stripping means being a comb-like member having a comb back extending across the front of said wheel adjacent said bag support and comb teeth projecting laterally from said comb back extending into the spaces between said projecting wall members on adjacent wheels.

In specific and preferred embodiments the wall member is a row of spaced flexible spokes projecting radially outwardly from the rim; or alternatively the wall member is a solid thin, flexible wall extending radially outwardly from the rim. Preferably the flexible spokes made to be replaceable if broken by being formed in two telescoping portions that have a male-female connection means. In still another preferred embodiment there is included a trash stripper similar to and outwardly from the nut stripper to serve the purpose of stripping away trash, twigs, etc. from the nuts being collected.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The features of this invention are best understood by reference to the attached drawings.

Figure 1:
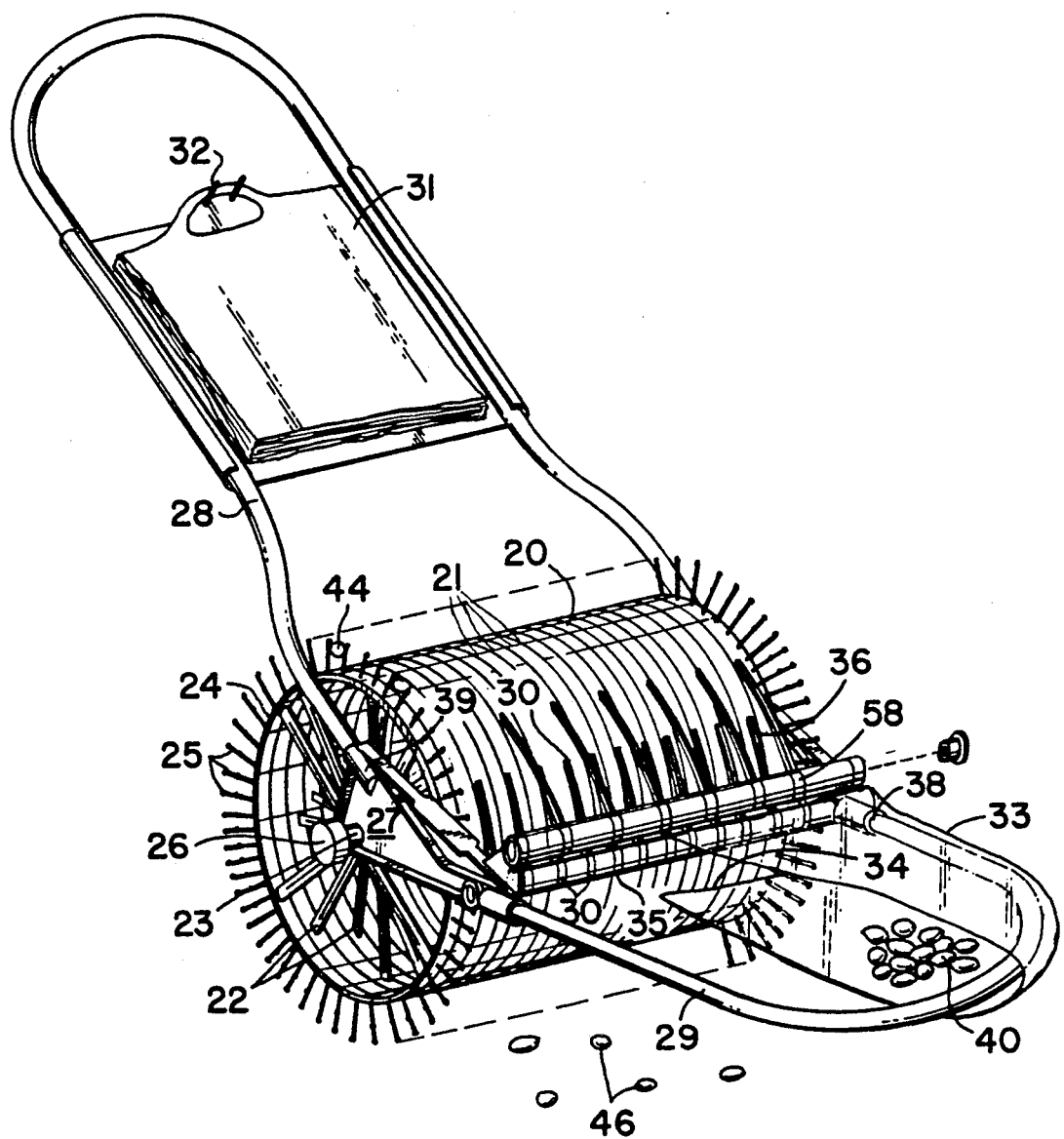
FIG. 1 is a perspective view of the nut harvesting apparatus of this invention.

In FIG. 1 there is shown the assembled nut harvester having a roller assembly 20, mounted on an axle 26 through a pair of journal members 27. Attached to the journal members 27 are a handle 28, a collection bag support 29, a nut stripper 30, and a trash stripper 58. The apparatus is pushed from behind by means of handle 28 which causes roller assembly 20 to roll over the ground picking up nuts 46 on the ground and which become caught in the roller assembly 20 as at 44, and remain in roller assembly 20 as it rolls forward until the nuts are contacted by teeth 36 of nut stripper 30 which pry the nuts loose and allow them to tumble over back 35 of nut stripper 30 into open end 34 of bag 33 on bag support 29 to be part of a collection of nuts 40 inside bag 33. Handle 28 is shown as including hooks 32 On Which a supply of empty bags 31 is hung for use when required. The hooks and supply of empty bags are not important to this invention and may be eliminated, if desired, or replaced by other means to hold empty bags on handle 28.

Figure 2:
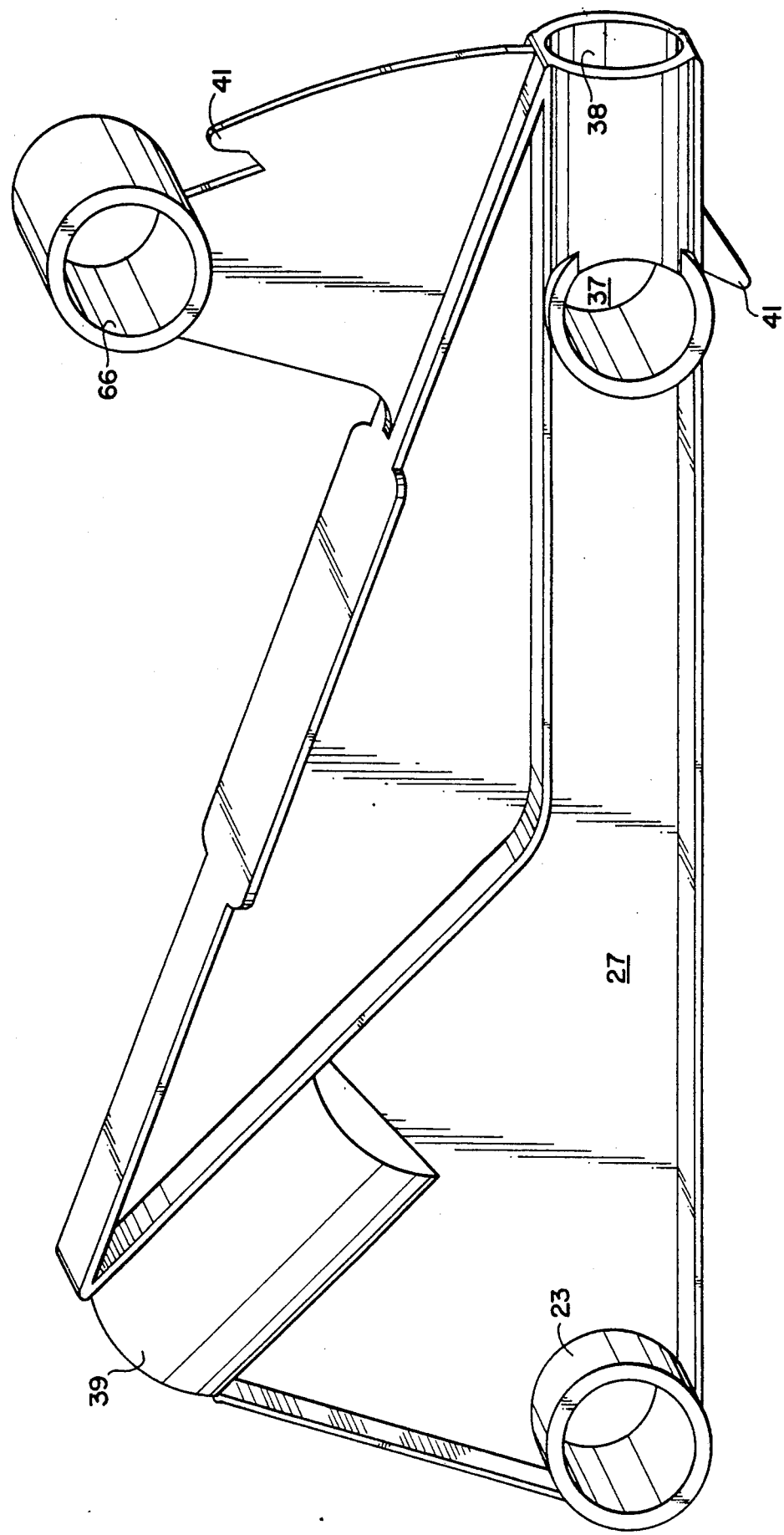
FIG. 2 is a perspective view of the journal member of this apparatus.
Figure 3:
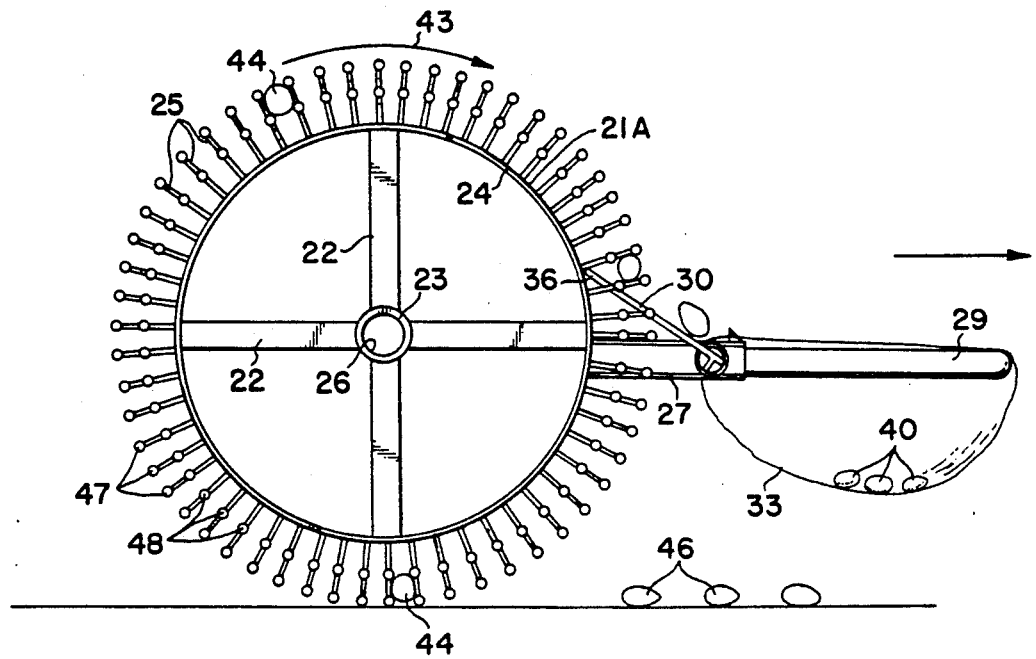
FIG. 3 is an end elevational view of the roller member, the nut stripper, the bag support and a bag as used to pick up nuts in the apparatus of this invention.
Figure 4:
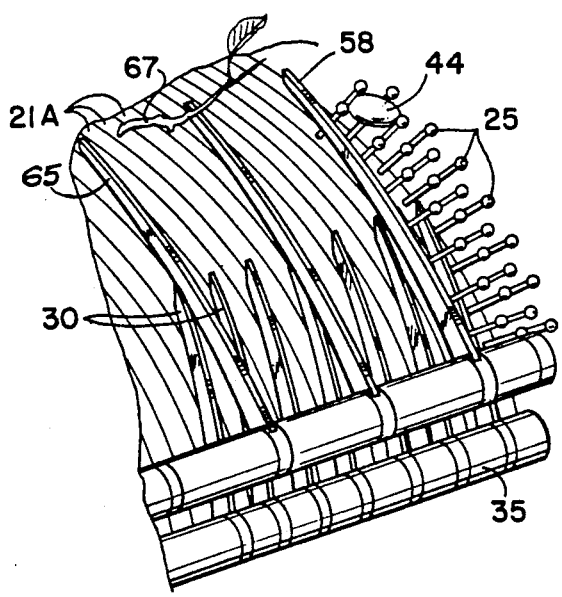
FIG. 4 is a perspective view of a portion of the apparatus showing the interaction of the nut and trash strippers and the roller member.
Figure 5:
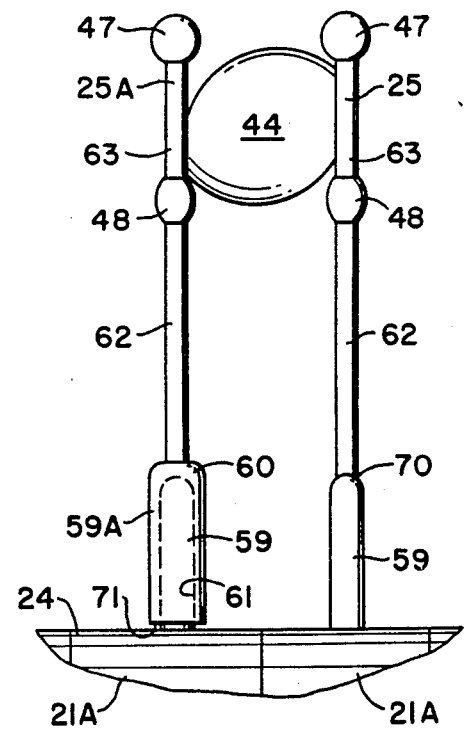
FIG. 5 is an enlarged elevational view of the spoke-like members on one embodiment of the wheel units of this invention.

In FIG. 2 there is shown one of journal members 27 which function as key support members for the entire harvester assembly. Two journal members 27 are needed for each apparatus in order to support other parts of the apparatus. An axle 26 is needed for roller assembly 20 and it passes through hub 23 of each journal member 27. Roller assembly 20 comprises a plurality of thin wheel units 21 placed side-by-side contiguously on axle 26 and are able to rotate around axle 26 separately and independently from each other. Each wheel unit (as seen in FIG. 3) has an outer rim 24 and a central hub 23 connected by internal spokes 22, or alternatively, may be connected by a solid disc between rim 24 and hub 23). A central bore in hub 23 forms a bearing for axle 26. Projecting outwardly from rim 24 is a flexible wall, which in the embodiment of FIGS. 1–5 is a circumferential row of spaced flexible spokes 25. The row of spokes 25 lie in a plane defined by the centerline of rim 24 and the center of the wheel unit 21A at the center of hub 23. FIG. 3 shows schematically how wheel 20 rolling in direction 43 toward pecans 46 on the ground picks up pecans 44 between adjacent spokes 25 with teeth 65 of trash stripper 58, as seen in FIG. 4, removing twig 67 and nut stripper 30 removing pecan 44 by teeth 36 and catching the pecans 40 in bag 33 on support 29.

The width of rim 24 is approximately the same as the smallest diametral dimension of the nuts being harvested. For pecans, which are oval in shape, this dimension would be the small overall dimension of the nut. For walnuts, which are approximately spherical, the dimension would be the diameter of the nut. It is, of course, to be understood that there is nothing critical in this definition because the spokes 25 are flexible and the wheel units 21 are not tightly pressed together. It is only necessary that the play between adjacent wheel units 21, the flexibility of spokes 25, and any other looseness in the structure be sufficient to allow nuts to be jammed between adjacent spokes 25 tightly enough to be restrained there until removed from the roller assembly 20 by the nut stripper 30. If more pressure between adjacent wheel units is desirable bungee cords may be wrapped around internal spokes 22 of several of the wheel units 21 in roller assembly 20. A desirable and preferred feature of spokes 25 is that shown in FIG. 3 where each spoke 25 has two spaced spherical knobs around the spoke. Outer knob 47 is at the tip of the spoke, and inner knob 48 is spaced inwardly from the tip by a distance about the size of the largest dimension of the nut. The actual dimensions of spokes 25 are not critical, but the overall length of each spoke 25 beyond rim 24 should be from about 1-3 times the maximum overall diametral dimension of the nuts being collected, and the distance between knobs 47 and 48 about one fifth of the length of spoke 25. Spokes 25 may be about 0.1 to about 0.25 inch in diameter and about 1–4 inches in length for most applications. Knobs 47 and 48 have diameters from about 1.1 to 1.25 times the diameter of spoke 25. Spokes are slightly flexible so as to accommodate various sizes of the nuts, but sufficiently stiff to be able to retain a nut between two or more adjacent spokes. Preferably spokes 25 are integral with rim 24. Each of the spokes 25 has a base portion 59 larger in diameter than shank portion 62 or tip portion 63. Thus, portions 62 and 63 are more flexible than base portion 59 and if a spoke 25 becomes permanently bent or broken, usually it will be at the intersection 70 or thereabove. Rather than replacing an entire wheel unit 21, one may instantly repair defective spoke 25 with replacement spoke 25A by clipping off the defective spoke 25 at intersection 70 and positioning replacement spoke 25A with its recess 61 over base portion 59 and forcing spoke 25A toward axle 26 until intersection 70 engages the bottom of the recess 61, i.e., note that the bottom 71 of spoke 25A does not engage the rim 24. The fit between recess 61 and base portion 59 affords a friction lock and inhibits any easy or inadvertent removal thereof during use of the apparatus. The replacement spoke 15A in all respects is identical to spoke 25 with respect to shank portion 62, tip portion 63 and knobs 47 and 48. The base portion 59A, in which recess 61 is located, by necessity is larger in diameter than base portion 59 since such base portion 59 tightly fits within recess 61.

Similarly collection bag support 29 is shown as U-shaped tubing with the ends of the tubing slidable into recesses 38 of journal members 27. Bag support member 29 is merely an internal support for a bag such that the open end 34 of the bag 33 will be adjacent recesses 38 and adjacent nut stripper 30 to be able to catch nuts freed from roller assembly 20.

Nut stripper 30 is a large comb-like structure with a comb back shaft 35 and comb teeth 36 pointed toward roller member 20. Teeth 36 are pivotally attached to shaft 35 which, in turn, is seated in recesses 37 in journal member 27. Each tooth 36 is positioned between adjacent rows of spokes 25 on adjacent wheel units 21 at an inclined angle upward so as to force nuts clamped between adjacent rows of spokes 25 to be pried loose therefrom and allowed to tumble freely over shaft 35 and into open end 34 of bag 33 on bag support member 29.

An additional preferred feature on journal member 27 is barb 41 which helps to hold bag 33 onto support member 29. In FIG. 2 there are shown an upper barb 41 and a lower barb 41. If the collection bag 33 has strap handles (as is the case of plastic bags in many grocery stores) the straps may be looped over barbs 41 to hold them in place. If the bags are burlap or other fabric, it may be convenient to push a hole in the bag where barbs 41 are located so as to hold the bag 33 in place. Other means than barbs 41 may be used to keep an open bag 33 on support 29, e.g., spring clamps, ties, etc.

Figure 6:
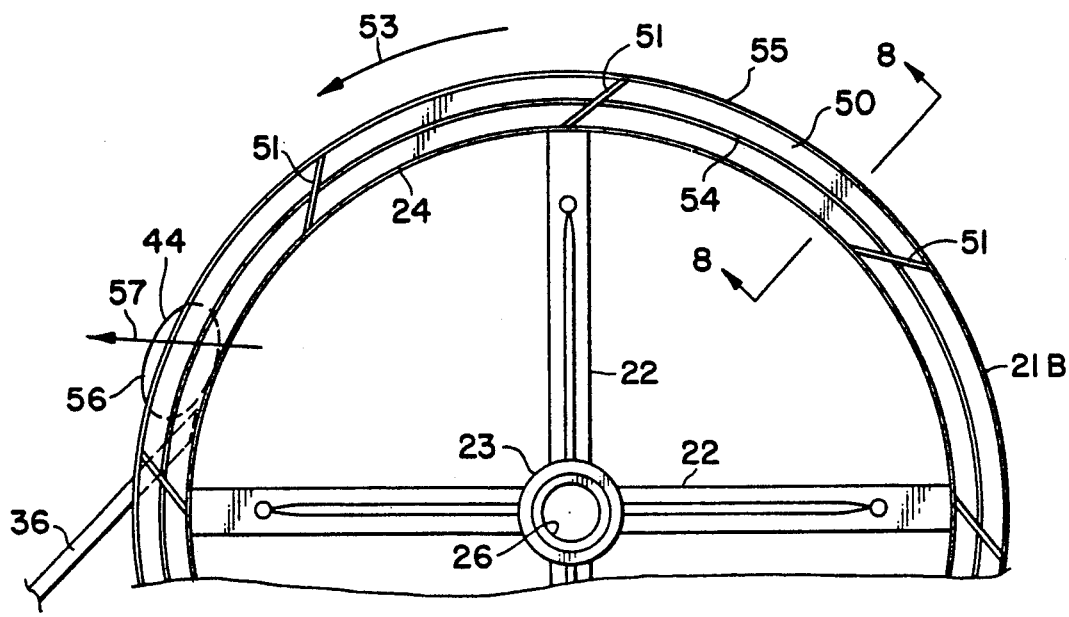
FIG. 6 is an end elevational view of a second embodiment of the wheel units of this invention.
Figure 7:
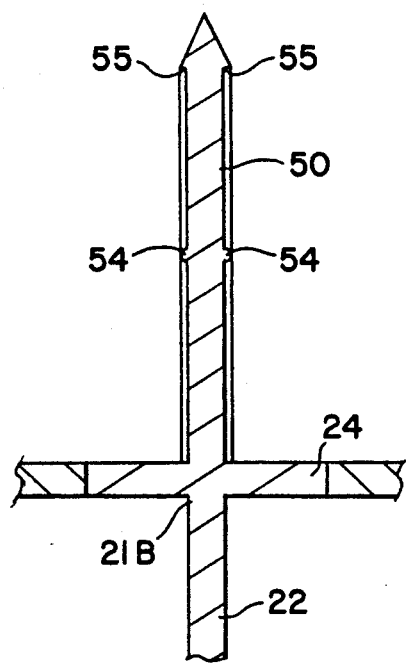
FIG. 7 is a front elevational view, partly in cross-section of the wheel units of the second embodiment of the invention.
Figure 8:
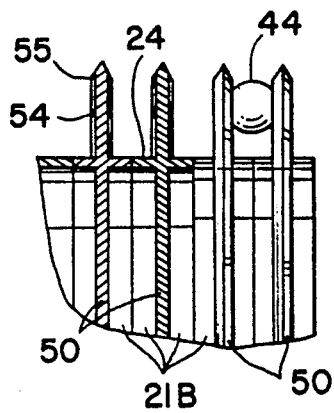
FIG. 8 is an enlarged cross-sectional view taken at 8—8 of FIG. 6.

Another embodiment of wheel unit 21 is shown in FIGS. 6–8. Wheel units in FIGS. 1–5 are labeled as 21A, while wheel units in FIGS. 6–8 are labeled 21B for purposes of distinction. The only distinguishing feature between units 21A and 21B is the structure of the upstanding wall member which contacts the nuts being collected. In wheel unit 21A the wall member is a row of spaced spokes 25 along the centerline of rim 24. In wheel units 21B (FIGS. 6–8) the wall member is a solid continuous thin wall 50 on the centerline of rim 24. Wall 50 is also slightly flexible as are spokes 25. Wall 50 has a small outer circumferential bead 55 extending outwardly on both sides of wall 50 at the outer edge of wall 55 and a small inner circumferential bead 54 extending outwardly on both sides of wall 50 about half way between the outer edge of wall 50 and rim 24. There also are a plurality of spaced tangential beads 51 on both sides of wall 50 extending from rim 24 to the outer edge of wall 50. The direction of tangential beads 51 is such that as wheel unit 21B rotates in the direction of arrow 53 beads 51 will tend to guide nut 56 outwardly, toward the outer edge of wheel unit 21B in the direction of arrow 57 when contacted by teeth 36 of nut stripper 30.

Preferably the entire harvester is made of polypropylene or polyvinylchloride (PVC), although it may be made of aluminum or other plastic materials. The harvester is easily dismantled into its various component parts for storage or repair.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A nut harvesting apparatus comprising a frame having a front, a back and two sides, a lateral axle extending from one to the other of said sides, a plurality of ground engaging nut collecting wheels individually rotatably mounted side-by-side on said axle, said frame including handle bar means at said back adapted to be pushed by a person walking behind said frame, a bag support at said front adapted to support an open collection bag thereon for receiving harvested nuts therein; and a nut stripping means to remove nuts from said wheels and direct them into said open bag; each said nut collecting wheel being a thin structure approximately the thickness of the smallest diametrical dimension of the nuts being collected and having a radially outwardly projecting wall member having a radial height outwardly of said rim being at least as large as said largest diametrical dimension of said nut and being adapted in combination with the wall member of the next adjacent wheel to clamp said nut therebetween, said stripping means being a comb-like member having a comb back extending across the front of said wheel adjacent said bag support and comb teeth projecting laterally outward from said comb back and extending into the spaces between said projecting wall members on adjacent wheels.

2. The device of claim 1 wherein said wall member is a plurality of equally spaced spoke members extending radially outward of said rim to free ends, each said spoke member being substantially in a single plane passing through the center of said wheel and the circumferential center of said rim.

3. The apparatus of claim 2 wherein each said spoke member is flexible and has a pair of spaced circumferential shoulders slightly larger in diameter than the diameter of said spoke, one of said pair of shoulders being at the free end of said spoke and another o said pair of shoulders being spaced inwardly from said free end.

4. The apparatus of claim 3 wherein each said spoke member includes a base member integral with said rim and an extension projection member having a shank portion and a tip portion, a replacement spoke member having an enlarged base member including an axial recess to fit tightly over said base member on said rim after removal of said shank and tip portions.

5. The apparatus of claim 1 wherein each said wheel is contiguous to the next adjacent wheel around the respective rims thereof.

6. The apparatus of claim 1 wherein said bag support comprises a U-shaped tubular member projecting outwardly and forwardly from said plurality of wheels at a level approximately equal to or below that of said axle.

7. The apparatus of claim 4 wherein said bag support includes a pair of barb like projections adapted to engage openings in said collection bag to hold it in place while receiving said harvested nuts.

8. The apparatus of claim 1 wherein said frame includes a pair of journal members each having a first socket for receiving one end of said axle, a second socket for receiving one end of said handle bar means, a third socket for receiving one end of said bag support, and a fourth socket for receiving one end of said nut stripping means.

9. The apparatus of claim 1 wherein said handle bar means is a U-shaped tubular member.

10. The apparatus of claim 1 wherein said comb back is a shaft and said comb teeth are pivotally and individually mounted on said shaft.

11. The apparatus of claim 1 which additionally comprises a second comb-like member having pivotable individual teeth mounted on a second shaft positioned vertically above said comb back shaft, said teeth of said second comb-like member being spaced along said second shaft a sufficient distance from the next adjacent teeth to permit said nuts to fall between adjacent teeth of said second comb-like member.

12. The apparatus of claim 1 wherein said wall member is a solid upstanding continuous wall lying in a plane through the center of said wheel and the circumferential center of said rim.

13. The apparatus of claim 12 wherein said continuous wall has two parallel sides, an outer free edge and an inner edge joining said rim, each side including a plurality of spaced linear beads projecting outwardly from said side in a direction tangential to said rim and extending from said inner edge to said outer edge and adapted to guide nuts clamped between adjacent walls from said inner edge to said outer edge.

14. A nut harvesting machine adapted to be rolled over the ground by a person pushing the device from behind in the manner of a lawn mower, said device including a handle, a collection bag support, an axle, a nut collecting roller member, a nut stripper and a trash stripper; said roller member comprising a plurality of thin wheels each mounted contiguous to each adjacent wheel so as to rotate independently about said axle, said axle being mounted in a pair of journal members having corresponding recesses to receive and support said handle, said collection bag support, said nut stripper and said trash stripper; each said wheel having a hub to receive said axle, a tubular rim spaced radially outwardly of said hub, and a plurality of spokes extending outwardly of said rim for a distance which is at least as large as the largest diametral dimension of the nuts being collected, said spokes being flexible with spaced circumferential beads around said spokes and being positioned such that all of said spokes lie in a plane defined by the centerline of said rim and the center of said wheel hub; said nut stripper being a first comb-like device having a lateral shaft as the comb back and a plurality of teeth mounted individually and pivotably on said shaft with said teeth pointing generally toward said axle and being positioned respectively between said spokes on adjacent said wheels; said trash stripper being a second comb-like device mounted vertically above said nut stripper and having a second shaft as the comb back and a plurality of teeth mounted individually and pivotably on said second shaft with said teeth of said trash stripper pointing generally towards said axle and generally above said teeth of said nut stripper and being spaced apart along said second shaft so as to permit nuts to fall between adjacent teeth of said trash stripper; said handle extending from said journal members upwardly and rearwardly of said roller member; said collection bag support being positioned forwardly and downwardly from said journal members and from said nut stripper, and being adapted to support a collection bag with an open mouth adjacent said nut stripper.

15. The machine of claim 14 wherein each of said handle and said collection bag support are U-shaped tubular members with ends thereof which form a male/female coupling with corresponding recesses in said journal members.

16. The machine of claim 14 wherein each said wheel includes internal spokes joining said hub to said rim in a stable wheel structure.

17. The machine of claim 14 wherein the thickness of each said wheel rim approximates the smallest diametrical dimension of the nuts being collected.

18. The machine of claim 14 wherein each said spoke outwardly of said rim includes a male base portion, a shank portion and an outer tip portion, said spoke being breakable between said shank and base portion, a replacement spoke carrying a female recess which fits over said male base portion axially to provide a single replaced said spoke;, said tip portion being flexible and having said circumferential beads at its free end, said female recess forming a friction locking fit to and around said male base member.

19. A nut harvesting apparatus comprising a frame and a handle mounted thereto for pushing same, an axle mounted to said frame, a nut collecting roller member mounted on said axle, a nut stripper positioned adjacent said roller member, a trash stripper positioned rearwardly of said nut stripper, said roller member including a plurality of thin wheels each mounted contiguous to each adjacent wheel so as to rotate independently about said axle, a collection bag support mounted to said frame forwardly of said roller member, each said wheel having a hub to receive said axle, a tubular rim spaced radially outwardly of said hub, and a plurality of ground engaging spokes extending outwardly of said rim for a distance which is at least as large as the largest diametral dimension of the nuts being collected, said spokes being flexible with spaced generally circumferential beads around said spokes and being positioned such that all of said spokes lie in a plane defined by the centerline of said rim and the center of said wheel hub, said nut stripper including a plurality of teeth having free ends respectively locate between said spokes on adjacent wheels with said free ends generally resting on said tubular rims of adjacent said wheels, said trash stripper including a plurality of teeth having free ends respectively located between said spokes on spaced apart sets of adjacent said wheels so as to permit nuts to fall between adjacent teeth of said trash stripper, a collection bag support being mounted to said frame and positioned generally forwardly and generally below said nut stripper, and being adapted to support a collection bag with an open mouth adjacent said nut stripper, said trash stripper being adapted to discharge trash and limbs above an open mouth of a collection bag.

20. The apparatus as defined in claim 19 wherein said spokes include a substantially rigid base stub portion, said spokes being breakable above said base stub portion, and cap spoke member having a hollow base portion adapted to fit tightly over said base stub portion after removal of said broken spoke generally above said base stub portion.

* * * * *